United States Patent [19]
Croft et al.

[11] Patent Number: 5,715,278
[45] Date of Patent: Feb. 3, 1998

[54] STANDBY POWER SAVING IN MOBILE PHONES

[75] Inventors: Thomas M. Croft, Cary, N.C.; Paul W. Dent, Stehag, Sweden; William J. Croughwell, III, Durham, N.C.

[73] Assignee: Ericsson Inc., Research Triangle Park, N.C.

[21] Appl. No.: 479,351

[22] Filed: Jun. 7, 1995

Related U.S. Application Data

[63] Continuation-in-part of Ser. No. 59,932, May 11, 1993.

[51] Int. Cl.$^6$ ............... H04B 3/46; G06F 11/00
[52] U.S. Cl. ............. 375/224; 375/365; 375/368; 371/47.1
[58] Field of Search ............. 375/224, 228, 375/200, 377, 365, 366, 364, 368, 362, 355; 370/241, 242, 248–253; 371/47.1, 69.1, 67.1, 2.1

[56] References Cited

U.S. PATENT DOCUMENTS

| | | | |
|---|---|---|---|
| 4,879,731 | 11/1989 | Brush | 375/116 |
| 4,964,121 | 10/1990 | Moore | |
| 4,967,411 | 10/1990 | Grover | 370/110.1 |
| 5,010,330 | 4/1991 | Snowden et al. | |
| 5,072,449 | 12/1991 | Enns et al. | 371/37.1 |
| 5,084,891 | 1/1992 | Ariyavisitakul | 371/42 |
| 5,103,459 | 4/1992 | Gilhousen | 375/200 |
| 5,109,530 | 4/1992 | Stengel | |
| 5,128,938 | 7/1992 | Borras | |
| 5,224,152 | 6/1993 | Harte | |
| 5,241,548 | 8/1993 | Dillon et al. | |
| 5,241,568 | 8/1993 | Fernandez et al. | |
| 5,406,613 | 4/1995 | Peponides et al. | 379/58 |
| 5,418,789 | 5/1995 | Gersbach et al. | 371/5.2 |
| 5,473,612 | 12/1995 | Dehner, Jr. | 370/105.4 |
| 5,528,621 | 6/1996 | Heiman et al. | 375/200 |

FOREIGN PATENT DOCUMENTS

| | | |
|---|---|---|
| WO92/02085 | 2/1992 | European Pat. Off. |
| 0 508 885 | 4/1992 | European Pat. Off. |
| WO94/27377 | 11/1994 | European Pat. Off. |
| 3834377 | 10/1988 | Germany |

Primary Examiner—Edward L. Coles, Sr.
Assistant Examiner—Madeleine A. V. Nguyen
Attorney, Agent, or Firm—Burns, Doane, Swecker & Mathis, L.L.P.

[57] ABSTRACT

A method and system for increasing the probability of receiving a message in mobile communication systems. The invention uses a synchronization pattern to determine the location of an intended message. In addition, the invention uses the CRC check status of several sample timing positions spanning an expected message location to determine whether to accept a message. The expected message location is based on the sample timings of previous messages which are determined from a histogram of how frequently various sample timing positions have been selected in the past.

30 Claims, 9 Drawing Sheets

MOBILE TELEPHONE RECEIVER ACCORDING TO THE INVENTION

WORD BIT STRUCTURE

MESSAGE WORD STRUCTURE

BUSY-IDLE BIT SUPERPOSITION

TWO-WORD MESSAGE

FIG.6 MESSAGE PROCESSING FLOW CHART ACCORDING TO THE INVENTION

SYNC ACQUISITION ACCORDING TO THE INVENTION

SYNC MAINTENANCE FLOW CHART ACCORDING TO THE INVENTION

MESSAGE WORD DECODING ACCORDING TO THE INVENTION

EFFICIENT DECODER MEMORY STRUCTURE

STANDBY POWER SAVING IN MOBILE PHONES

The present invention is a Continuation-In-Part of U.S. patent application Ser. No. 08/059,932 to Croft, et al. filed May 11, 1993, herein incorporated by reference.

FIELD OF THE INVENTION

This invention relates to a method of and apparatus for reducing power consumption in portable communication systems (such as mobile telephones) in standby mode, thereby extending battery life.

DISCUSSION OF THE RELATED ART

In U.S. patent application Ser. No. 08/059,032 to Croft, et al., filed May 11, 1993, a method is proposed to reduce standby power consumption in mobile telephones. The method includes cumulative majority voting of Manchester-coded bits over successive message repeats (e.g., up to five in each transmitted word), checking the CRC (Cyclic Redundancy Check), and —if the CRC checks —powering down to avoid processing further message repeats unnecessarily. It can also include comparing the Mobile Identification Number (MIN) of the mobile to that part of the MIN contained in the first half of the message. If the bits do not match and the message continuation flag is set (indicating at least a two-word page), the mobile in question does not need to process the second half of the message and may return to standby mode, thereby saving power and extending battery life.

Analyzing a received message in the above manner relies upon achieving message synchronization. Transmissions contain a known bit pattern to assist in establishing message synchronization. When the search for that pattern fails, the word is lost.

SUMMARY OF THE INVENTION

The present invention provides reduced standby power consumption while simultaneously increasing the probability of receiving the intended message. As in patent application Ser. No. 08/059,032 referred to above, a synchronization pattern is sought, but the inventive method also uses the CRC check status of several trial sampling positions spanning the expected message location (based on the sample timing of previous messages) as an additional means to locate the message. The expected sample timing is determined from a histogram of how frequently various sampling positions have been selected in the past.

BRIEF DESCRIPTION OF THE DRAWING

The present invention will now be described by way of example with reference to the following drawing figures, in which.

DETAILED DESCRIPTION OF PREFERRED EMBODIMENTS

Message Structure

Figure 1:
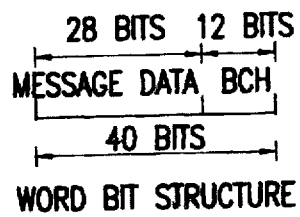
FIG. 1 shows a prior art bit structure of a control word.

FIG. 1 shows the structure of one 40-bit control word comprising 28 message bits and 12 CRC bits according to the EIA-553 cellular standard. The CRC code, whose value depends on the data bits, provides powerful error detection capability and optionally the ability to correct any single-bit error in the 28-bit message in a manner described hereinafter.

Figure 2:
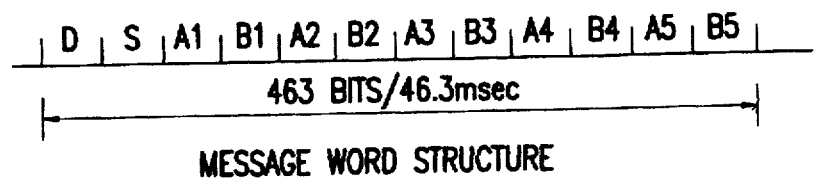
FIG. 2 shows a prior art structure of a receive cycle for a mobile station.

FIG. 2 shows the structure of one transmit cycle according to EIA-553. Each transmit cycle conveys five repeats A1, A2, ... A5 of a first 40-bit word "A" and five repeats B1, B2, ... B5 of a second 40-bit word "B." The A and B words belong to independent messages intended for mobile phones having odd and even MINs, respectively.

Figure 3:
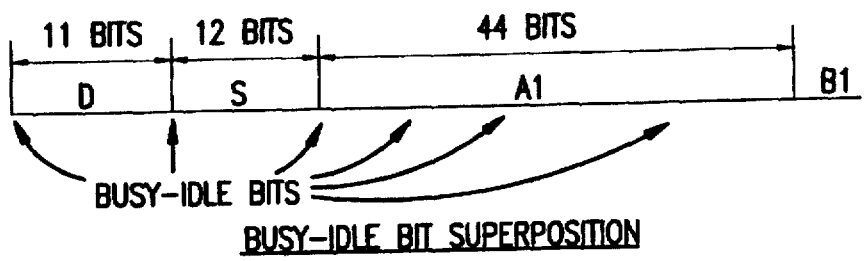
FIG. 3 shows a prior art preamble bit-block D and S shown in FIG. 2.

FIG. 3 shows more detail of the preamble bit-blocks labeled D and S in FIG. 2. The "dotting sequence" D is a 10-bit block of alternating 1's and 0's intended to provide the receiver with symbol resynchronization opportunities. Symbols are transmitted using Manchester code, in which a "1" is represented by a signal upswing followed by a signal downswing and a "0" is reproduced by a downswing followed by an upswing. In the EIA-553 cellular standard, the bit rate is 10 kb/s. The alternating 1's and 0's after Manchester coding then appear as a 5 kilohertz tone. The Manchester-coded bits are transmitted using frequency modulation of a radio carrier. Preceding the 10-bit dotting sequence is a single bit busy/idle flag, giving the total 11 bits labeled "D" in FIGS. 2 and 3.

Following the dotting sequence D is an 11-bit sync word also preceded by a busy/idle flag, making the 12 bits labeled "S" in FIGS. 2 and 3. There then follow five repeats, each of two 40-bit calling messages designated A and B. Four extra busy/idle bits are inserted in each message repeat making 44-bit blocks, as shown in FIG. 3. The total number of bits in a calling channel cycle is thus 1+10+1+11+2×5×(40+4)=463 bits.

Figure 4:
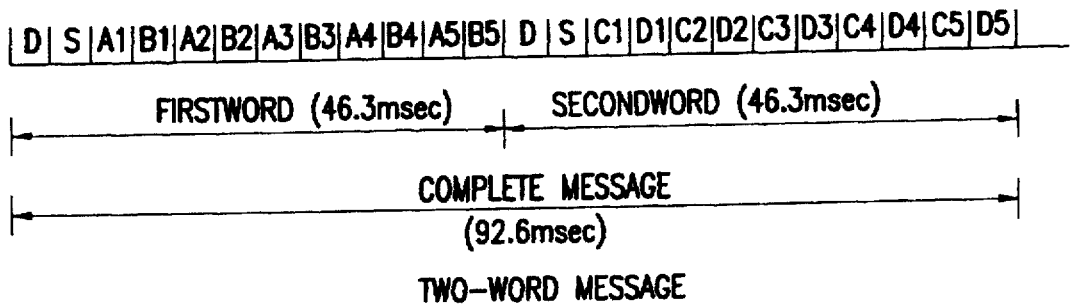
FIG. 4 shows a prior art structure of two words containing the Mobile Identification Number.

In the event that a mobile station is called, it takes two 40-bit words to convey all 34 bits of its MIN, as shown in FIG. 4. Thus, the first 24 bits of its MIN are sent in a first cycle and the remaining 10 bits of the MIN are sent in a second cycle. The first word of the multiple word message contains a flag to indicate that continuation words are to be expected. Continuation words have a continuation flag set. The continuation flag appears in either the A or B word depending on whether the mobile has an odd or even MIN.

A call can in some cases consist of more than two words and so it is necessary to look at the third word to determine if it is a continuation of an already begun message, or of a new message. However if it is determined that the first word does not match the bits of the mobile's MIN, then the second and third words do not need to be processed even if the continuation flag is set. Other possible message types are dummy messages, or filler, which may be a single word that can be ignored, and a one- or multiple-word broadcast or "overhead" message that is to be processed by all mobile phones.

Overview of the Inventive Method

Figure 5:
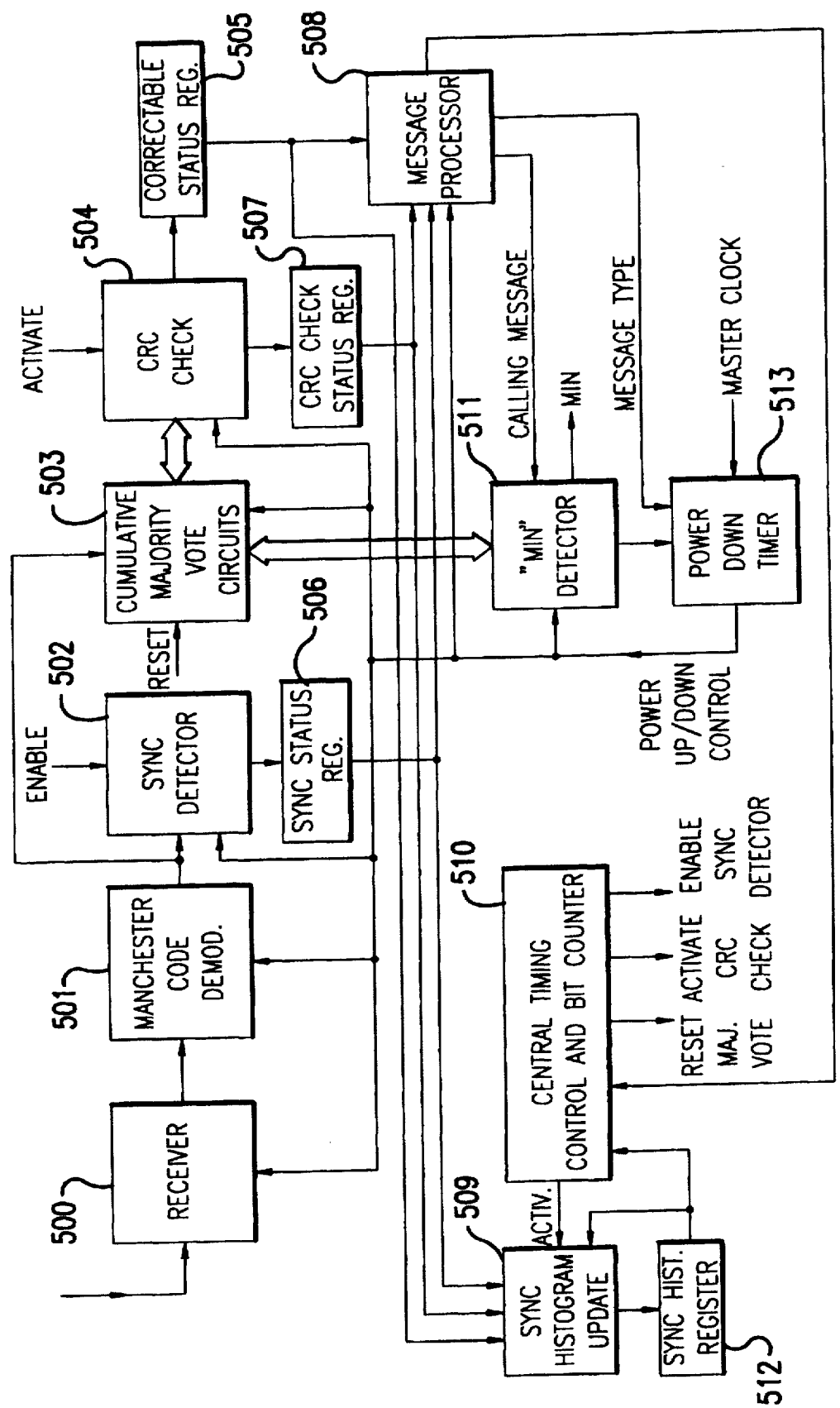
FIG. 5 is a block diagram of a mobile telephone receiver in accordance with the present invention.

FIG. 5 is a block diagram of a mobile telephone receiver according to the present invention for receiving and decoding messages transmitted in accordance with the formats shown in FIGS. 1–4. An antenna and receiver 500 such as the Manchester receiver disclosed in U.S. patent application Ser. No. 08/053,860 (herein incorporated by reference) receives, amplifies, and filters signals received from a base station and down converts them to a suitable frequency for processing. A Manchester code demodulator 501 processes these signals to determine transmitted bit polarities and passes the processed bits to both a sync detector 502 and cumulative majority vote circuit 503. The Manchester code demodulator 501 and sync detector 502 can include a conventional frequency discriminator.

The data is sampled at 8 samples per bit with each bit corresponding to 8 received samples. Therefore, a two-bit span in time contains 16 samples. The cumulative majority vote circuit 503 provides cumulative majority vote decoding for each of the 40 bits in a received control message for each of 16 trial sample timing positions (all 8 possible sample phases over a span of two bits). The outputs of these circuits are fed to CRC check circuits 504. The sync detector 502 also writes the status of each trial sample phase to a 16-bit sync status register 506. A logical "0" is written to register locations associated with trial sample phases for which no sync match is found, a "1" to those locations associated with trial sample phases for which a match is found. In a similar way, the CRC check circuitry 504 writes the CRC-check and a single-error-correctable status of each of the trial sample phases to the first and second CRC check-status registers 505 and 507. Single-error-correctable status is determined by comparing the syndrome of a trial message word with 40 prestored single-error syndromes. A message processor 508 processes the information contained in the three status registers (505, 506, and 507) to determine whether or not to accept the current message. If it is accepted, the bits of the decoded message are compared to the bits of the MIN by the MIN detector 511 to determine if the call is for the mobile in question or a different one. If any bit differs then it is determined that the message is not for the mobile in question. The message processor also informs the power down timer 513 whether the message is a one- or two-word page. A central timing control and bit counting circuit 510 determines when certain other blocks such as the sync detector and CRC check circuits should be activated. It should be noted that if the system powers down the timing circuit 510 must continue to run so that framing is maintained.

A sync histogram register 512 stores the relative frequency with which each of the 16 trial sample phases have been selected as the final sample timing position since initialization. The sync histogram update circuit 509 maintains the sync histogram and shifts the histogram when the center of the search window (the timing position over which bit matches are searched) must be repositioned.

Figure 6:
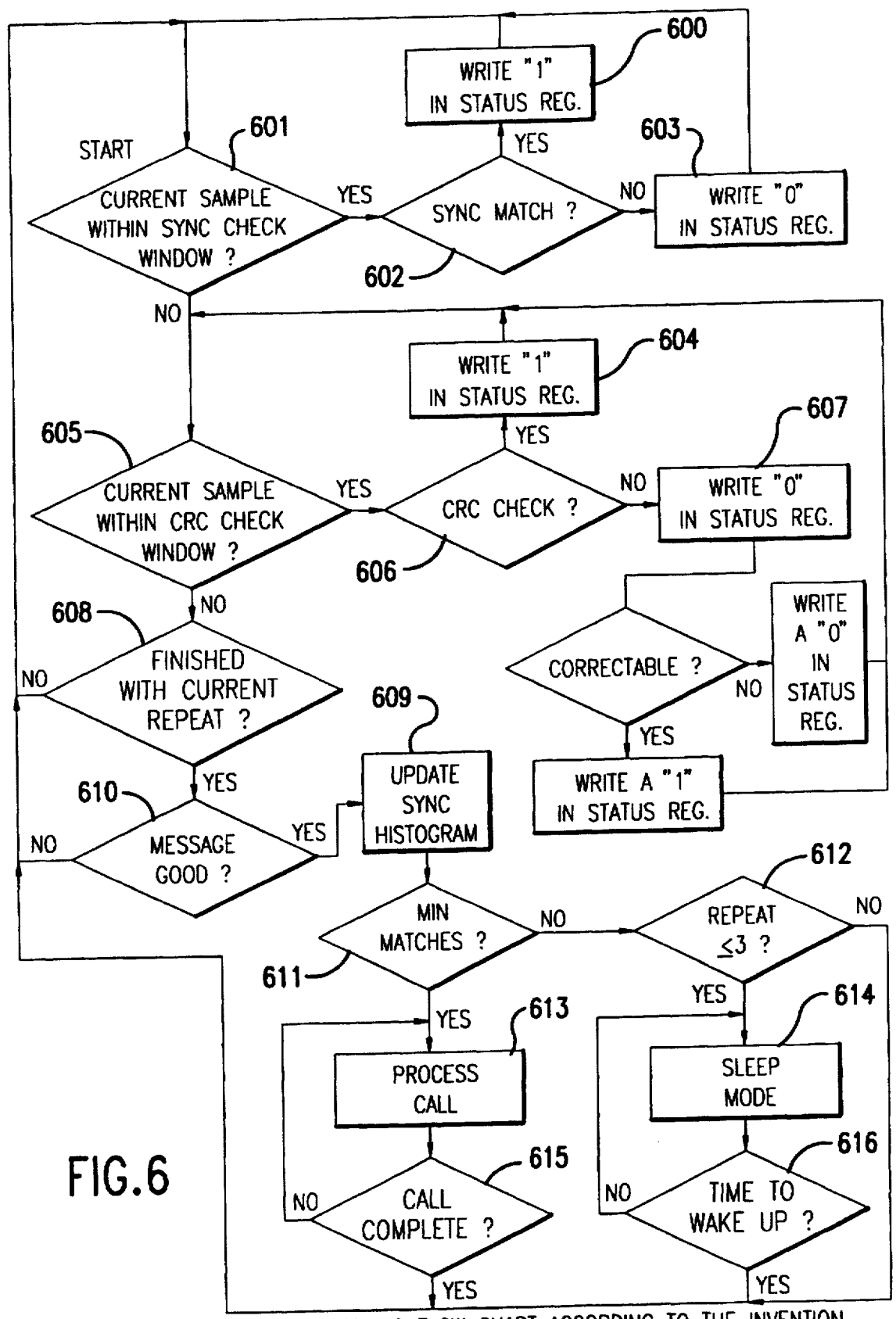
FIG. 6 is a flow chart showing the overall operation of the present invention.

FIG. 6 explains the message processing approach of the inventive method. Beginning at Step 601, the method determines whether or not the current sample falls within the sync search window. If so, the trial sync word is hard-decision-decoded at that sample position and compared to the known sync word (602). If it matches, a "1" is written to the sync status register in the position corresponding to the sampling position in question (600). If there is no match, a "0" is written (603). If the current sample is not within the sync search window, a test is conducted to determine whether or not it is within the CRC check window (605). If it is within the CRC check window then the CRC is checked at that sampling position for the previous 40 message bits (excluding B/I bits) (606). The appropriate status ("1" for check (604), "0" for failure (607)) is then written to the CRC check status register in the location corresponding to that sampling position. This process is continued until the current repeat is complete (608), at which time the sync and CRC check status registers are used to accept or reject the message (610). More will be said about the precise acceptance criteria below.

Once one of the 16 trial messages has been accepted, the sync position histogram is updated (609) (explained more fully below), and the decoded MIN bits are compared to those of the mobile in question (611). If they all match, the call is processed (613) until complete (615). If any bit does not match, the method checks the repeat number is no greater than three (612) before entering a sleep mode (614) until it is time to process another page (616). In an alternative embodiment, if the current repeat is number four or five when the message is first accepted, the method could decide not to enter a sleep mode; because the available time to sleep before awakening to process the next message is short, and may result in smaller power savings than the re-start overhead power.

Synchronization Acquisition and Maintenance

Figure 7:
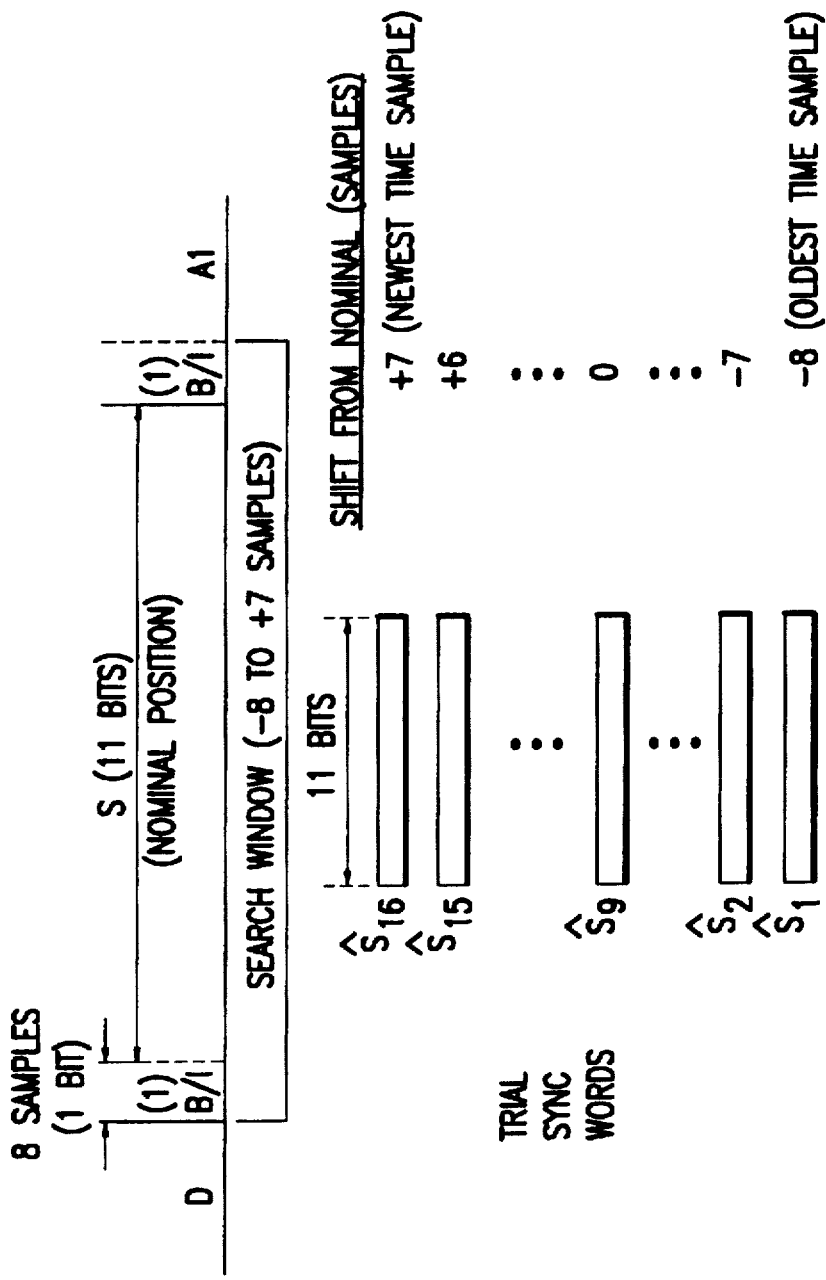
FIG. 7 shows how the synchronization pattern S shown in FIG. 2 is located by testing a total of 16 different sampling positions.

Once initial synchronization has been established, fine synchronization (sampling phase selection) is obtained for successive messages by searching for the sync word at a total of 16 different sampling positions centered about the expected position based on the sample timing of previous messages (the procedure for maintaining this expected sample timing position from message to message will be more fully discussed later in this section). This process is illustrated in FIG. 7. From the expected sync position, the data is demodulated and the resulting bits compared to the known sync pattern for the sampling positions up to 8 earlier in time and 7 later in time for a total of 8+1+7=16 sampling positions. Calling the sampling position earliest in time number 1 and the latest in time number 16, a "1" is written to the ith location of a 16-bit register if the trial sync word demodulated at sampling position i matches the sync pattern. If it does not match, a "0" is written to that location.

Figure 8:
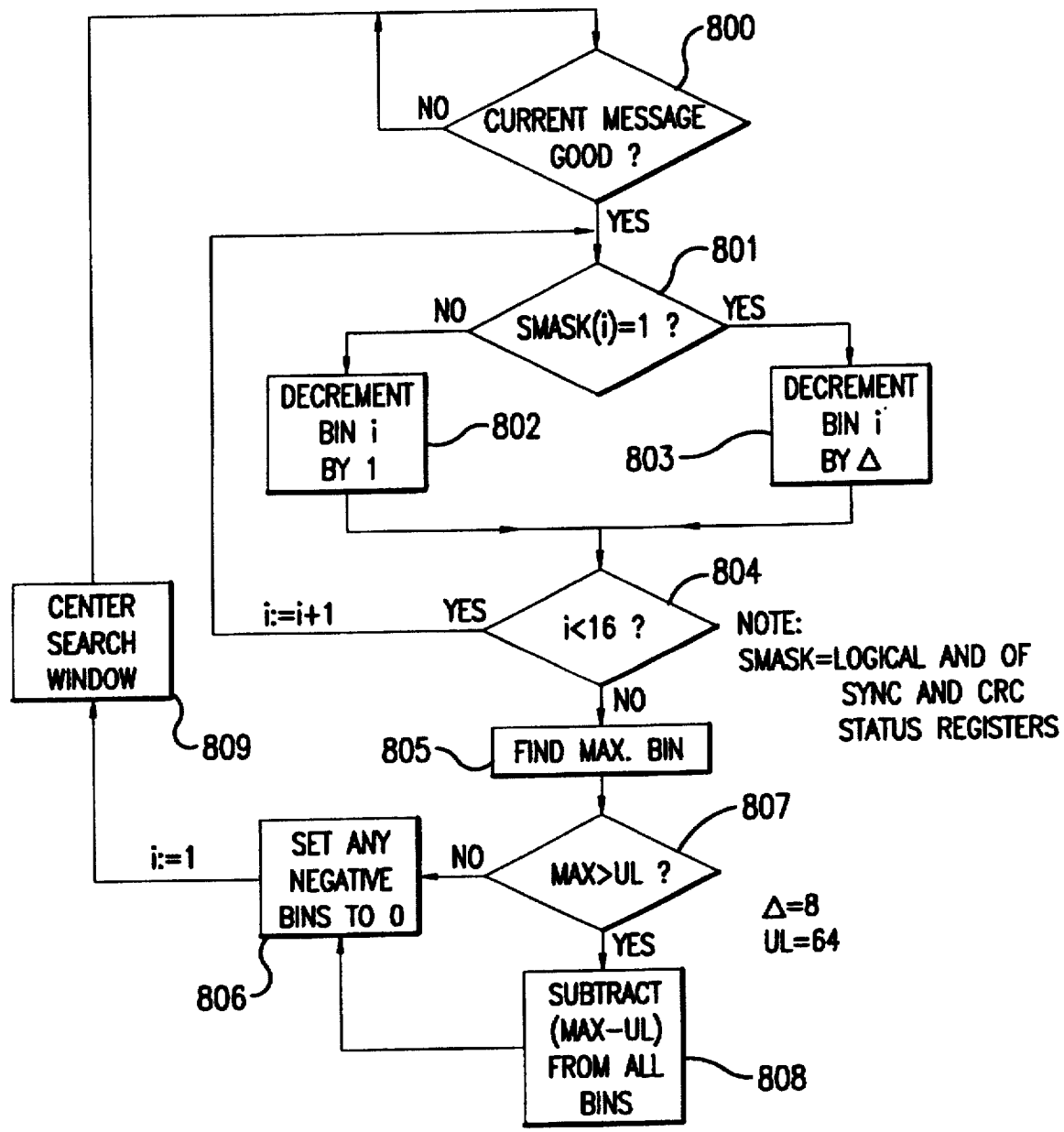
FIG. 8 is a flow chart showing how the sample timing is maintained from message to message in accordance with the present invention.

FIG. 8 is a flow chart explaining how fine synchronization is maintained from message to message through the use of a histogram. Notice that the sync histogram is only updated when a message is accepted (deemed correct) by the system (800). Whenever a message is accepted, the logical AND of the sync status register and the CRC check register is completed to form a new 16-bit register called SMASK (801). Therefore, each location of SMASK equal to "1" represents a sampling phase where sync was found and the CRC checked simultaneously. The sync histogram, also 16 elements long, corresponds to the same 16 sampling positions as the status registers. Each element of the histogram is a "bin" which acts as an accumulator associated with a particular sampling position. Each histogram bin associated with a sampling position for which SMASK is "1" is incremented by some amount Δ(in one practical implementation, 8 was used) (803). Each histogram bin associated with a sampling position for which SMASK is "0" is instead decremented by one (802). This continues until all 16 sampling positions are checked (804).

Next, the largest bin is found and its index is recorded (805). If it exceeds a predetermined upper limit UL (64 in one implementation (807)), the excess is subtracted from all bins (808). Finally, any bins that have become negative in this process are set to zero (806) (both the top and bottom are clipped). Once the index of the largest histogram bin is known, the center of the search window is adjusted (809) for the following message accordingly so that the sampling position associated with the maximum histogram location is always the center of the search window. This means the histogram itself must be shifted so that the correspondence between sampling positions and bins is preserved. In other words, if S is the index of the center of the sync search window and MAX is the index of the largest histogram bin, the new center-of-sync-search-window index becomes S+(MAX-9). (Recall that position 9 is the nominal center of the search window.) The histogram is then shifted by (MAX-9) positions, where a positive offset represents a right shift and a negative off set represents a left shift. Whenever the histogram is shifted, a zero value is shifted to the vacated end bin. This histogram-based sync maintenance approach of the inventive method provides stable synchronization, even in adverse channel conditions.

Demodulation

Figure 9:
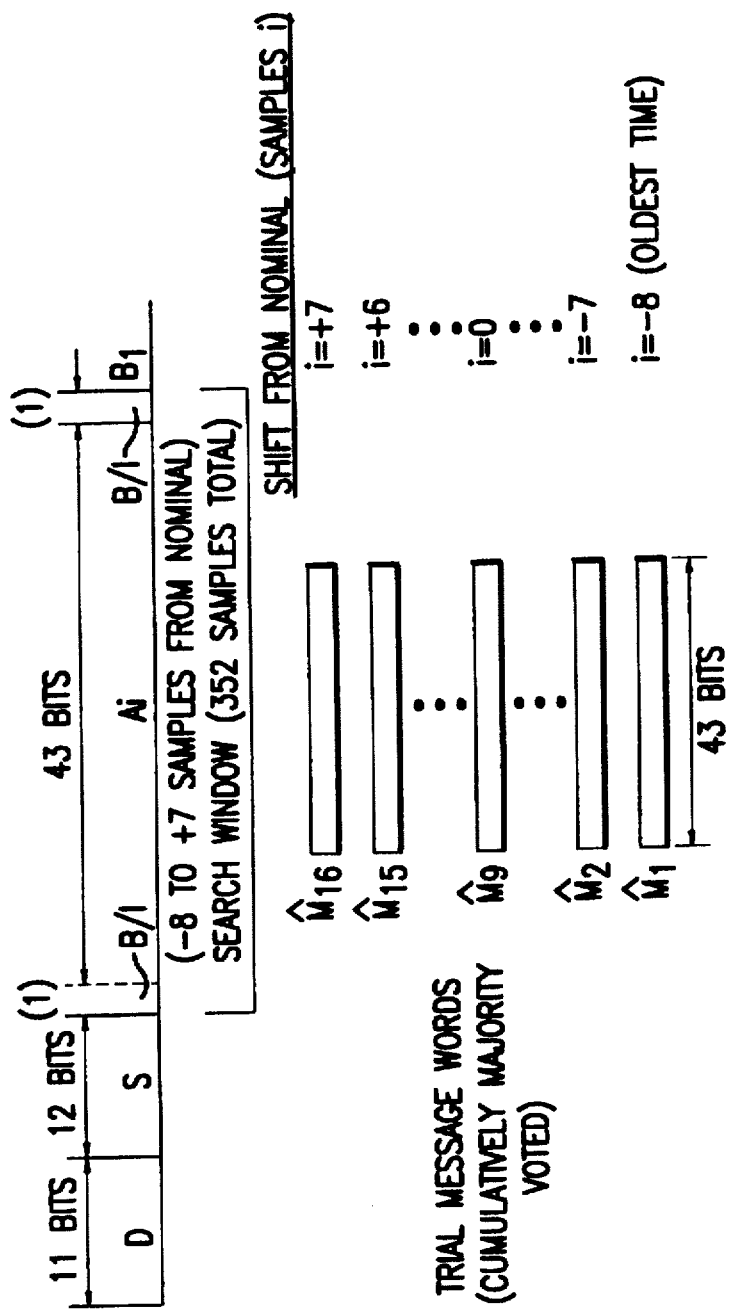
FIG. 9 illustrates how the cumulative majority vote is computed for 16 different sampling positions.

FIG. 9 shows the process by which the inventive method attempts to overcome the possibility of failure to locate the sync word. Independent of the search for the synchronization word, the receiver searches for the message by cumulatively majority voting the samples up to and including the current repeat over a 352-sample (Eight 44 bit words) window spanning the expected message position, demodulating the data at 16 different sampling positions, and checking the CRC for each one. The 16 sampling positions correspond to the same 16 sampling phases tested for sync match. Their location is obtained by adding the known offset to the expected sync position (center of the search window), yielding the center of the search window for the trial CRC checks. As with the sync search, 8 positions earlier in time and 7 ahead in time of the center location are considered in addition to the center location. This results in 16 trial messages ($M_i$) each 43 bits long. If the CRC checks for the trial message decoded at sampling position i, a "1" is written to location i of the CRC Check Status Register.

Status Registers and Message Acceptance Criteria

Figure 10:
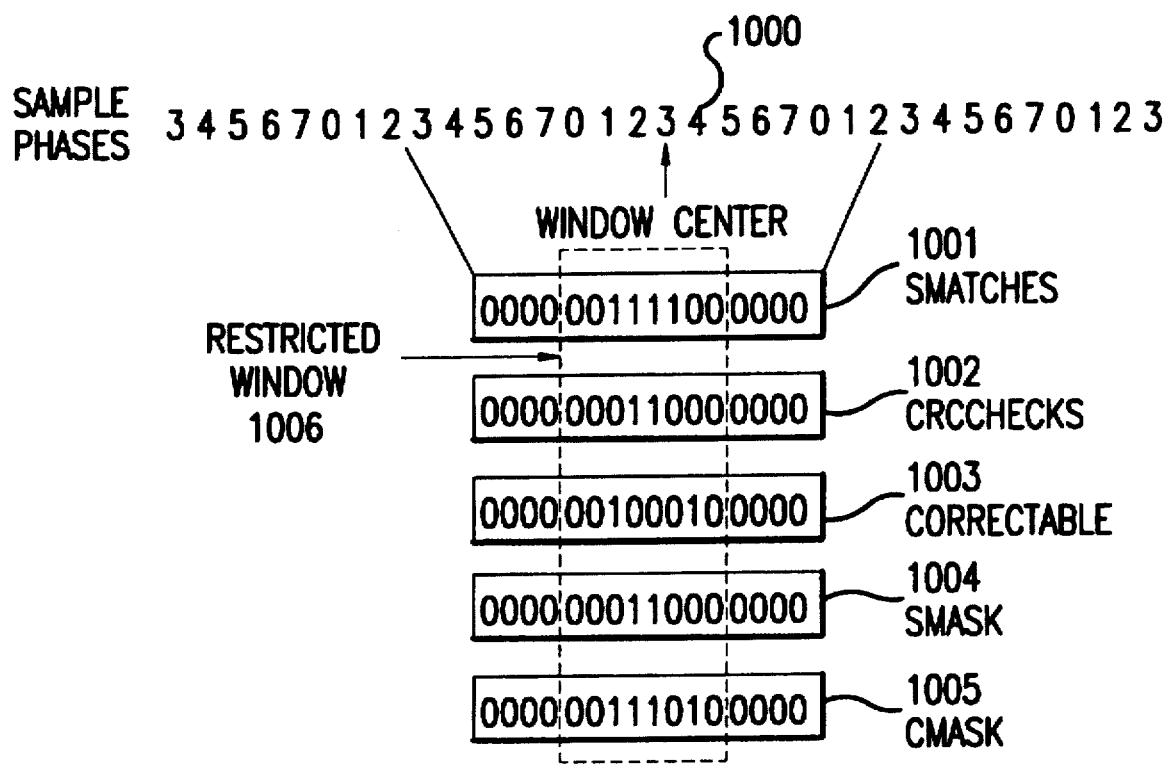
FIG. 10 shows the registers containing synchronization, CRC check, and single-error status (correctibility) for the 16 trial sampling positions used to accept or reject messages.

FIG. 10 shows the status registers used by the exemplary embodiment of the inventive method in determining whether to accept or reject messages. After each repeat has been processed, these registers are evaluated to determine whether or not a correct message has been obtained, whether the MIN bits match those of the mobile telephone in question, and whether or not it is possible to power down to conserve battery life. Again, the search window 1000 spans a total of 16 sampling positions. Register SMATCHES (1001) is the sync status register 506 described previously. CRCCHECKS (1002) is the CRC check status register 507 explained previously. CORRECTABLE (1003) contains the single-error status of each sampling position corresponds to register 505. Sampling positions for which a single-bit error (which is always correctable for the code considered here) was found are indicated with a "1" in this register. All others receive a "0." The register SMASK (1004) mentioned earlier is the logical bit-wise AND of the sync status register 506 and the CRC check status registers 505, 507. It tells the message acceptance logic for which sampling phases both sync match and successful CRC check were obtained. CMASK (1005) is the logical bit-wise OR of CRCCHECKS and CORRECTABLE. This register tells the message acceptance logic whether one or fewer errors were found in the data at each of the sampling positions considered based on the results of the CRC checks. In the inventive method, single error correction is optional.

The mobile telephone receiver accepts or rejects messages according to the following exemplary criteria:

If there is exactly one non-zero location in SMASK, the message is accepted at that sampling position. If SMASK is non-zero at more than one location, the message is accepted at the sampling position closest to the center of the search window for which SMASK equals "1."

If all locations in SMASK are zero but there is exactly one location in CRCCHECKS that is non-zero, the message is accepted at that sampling position if it is within a smaller window from 4 sampling positions behind to 3 ahead of the center of the search window. If CRC-CHECKS is non-zero at more than one location, the message is accepted at the sampling position closest to the center of the search window for which CRC-CHECKS equals "1" which is also within a smaller window from 4 sampling positions behind to 3 ahead of the center of the search window. This restricted secondary window is shown in FIG. 10 (1006). Restricting the acceptance region in these cases helps prevent the acceptance of spurious CRC checks.

When single error correction is employed, the previous criterion is modified as follows: each occurrence of "CRCCHECKS" in the previous paragraph is replaced by "CMASK." Otherwise, the logic is identical. This allows sampling positions for which the trial message contains a single error to be accepted.

Memory Organization in the Demodulator

Figure 11:
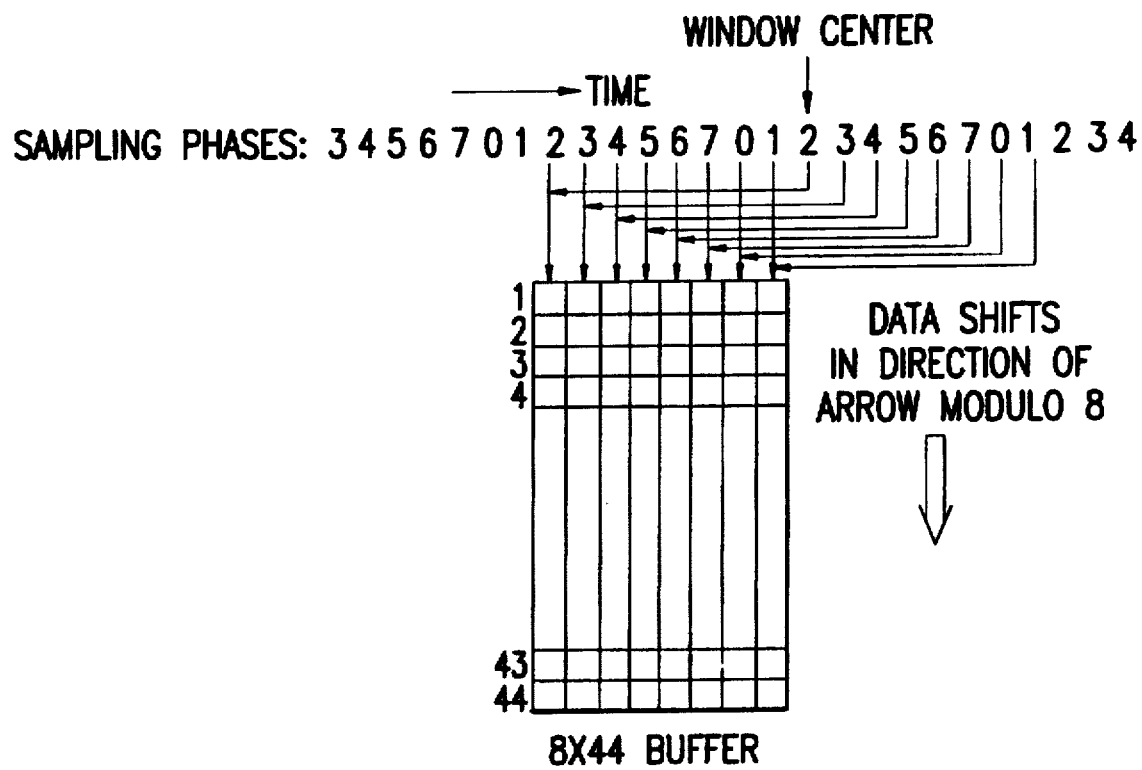
FIG. 11 is a diagram illustrating an efficient method of organizing the decoder memory of the inventive method.

To implement the inventive method, it is not necessary to buffer 16 trial messages. FIG. 11 demonstrates that memory may be organized in the decoder so that the first 8 sampling positions in the search window map to 8 shift registers. By adding one extra bit to each of these shift registers, the trial message words associated with sampling positions 9–16 can be obtained by simply extracting bits 2–44 instead of 1–43 (including the B/I bits). In other words, we shift the contents of each of the 8 shift registers by one bit toward the highest index in FIG. 11 to obtain the trial messages associated with sampling positions 9–16.

Performance Comparison Between Previous and Present Inventive Method

Figure 12:
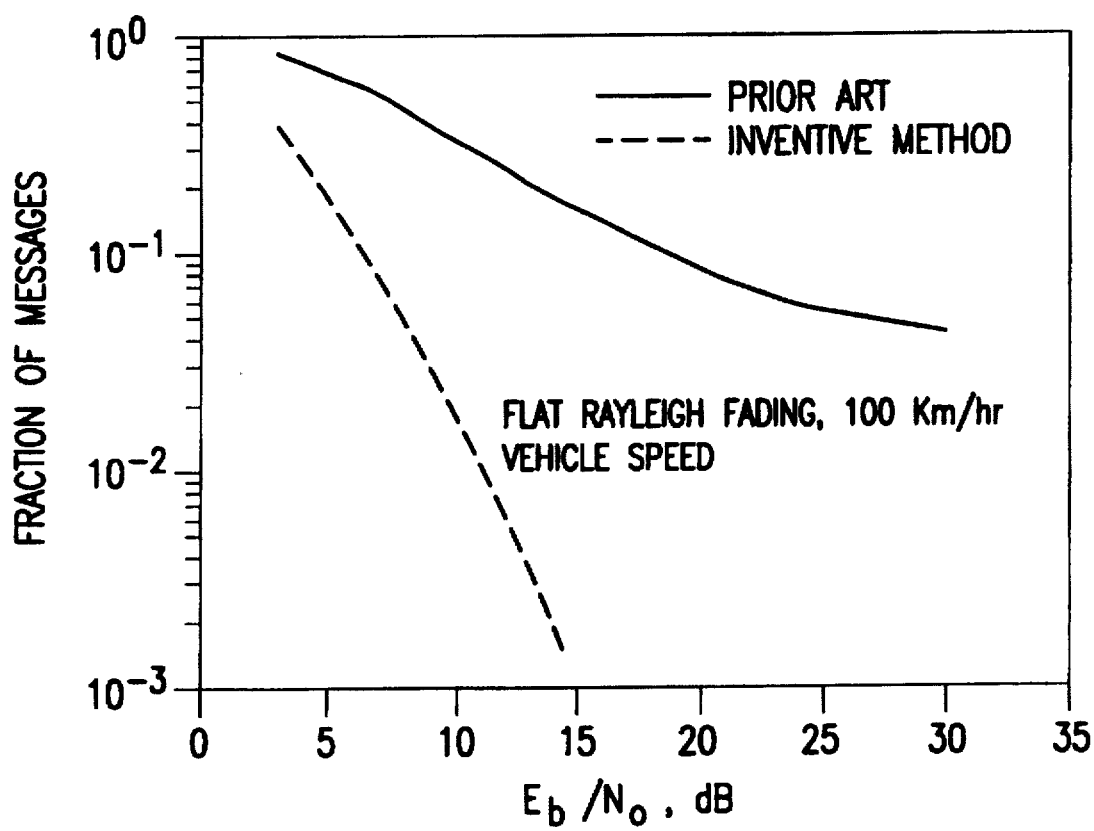
FIG. 12 is a graph comparing the performance of the present invention with that of the prior art method set forth in Croft, et al.

FIG. 12 is a performance graph of the results achieved by one of the previous methods disclosed in U.S. patent application Ser. No. 08/059,032 and the present inventive method. Shown is the fraction of messages lost as a function of $E_b/N_o$ in dB. Flat Rayleigh fading and a vehicle speed of 100 km/hr are assumed. As can be seen from the graph, the improvement with the inventive method is greater than 10 dB at one per cent lost message rate.

A significant contribution of the inventive method is the concept of locating messages even when the synchronization word is not found, with the aid of rapid CRC checks on multiple sampling positions using custom, optimized hardware logic. A second innovation is the method for maintaining the synchronization maintenance histogram. This method uses both sync match and CRC check criteria in incrementing or decrementing the histogram bins, and the bins are clipped both on the high and low end.

The present invention has been described by way of example. Modifications and variations of the exemplary embodiment will suggest themselves to skilled artisans in this field. The scope of the invention is to be measured by the appended claims and equivalents thereof.

We claim:

1. In a radio communications system having at least one base station serving one or more mobile stations, a method to increase the probability of receiving an intended message comprising the steps of:

receiving messages in a mobile station from at least one base station, said messages comprising repeated blocks of information bits, each block including a number of data bits and a number of check bits whose value depend on the data bits;

processing said repeated blocks sequentially to determine a sample timing based on a histogram of sync frequency for various sampling positions which have been previously tested; and locating the intended message in the repeated blocks by determining an expected message location from said sample timing and the check bits of sampling positions around said expected message location.

2. A method in accordance with claim 1, further comprising the step of:

maintaining a histogram of sync frequency for various sampling position within a sync search window by shifting the histogram whenever the center of said sync search window used to determine said expected message location is repositioned.

3. A method in accordance with claim 1, wherein said sync histogram is only updated when a message acceptance criterion is met.

4. A method in accordance with claim 1, wherein said locating step further comprises the steps of:

accumulating values of said information bits of said repeated blocks;

determining a sync status indicating if a sync word match is found for a current sample timing;

determining a CRC check status from the check bits; and processing the sync status and check status to determine whether to accept the current message.

5. A method in accordance with claim 4, wherein said sync histogram is only updated when a message is accepted.

6. A method in accordance with claim 5, further comprising the steps of:

comparing the message with a mobile station identification number, if the message is accepted, to determine if the message is for the mobile station; and determining whether to power down the mobile station after acceptance of the message.

7. In a radio communications system having at least one base station serving one or more mobile stations, a method to increase the probability of receiving an intended message comprising the steps of:

receiving control messages in a mobile station from said at least one base station, each message comprising blocks of information bits and sample timing positions, each block including a number of data bits and a number of check bits whose values depend on the data bits;

determining a sync search window of sample timing positions centered about the expected position of a sync word and determining a sync status indicating if a sync word match is found for a current sample;

determining if the current sample falls within said search sync window;

testing the check bits and updating a check status for the location corresponding to the current sample timing positions;

determining whether or not the current sample timing is within a check window of sample timing positions corresponding to the sample timing positions determined for said sync search window; and accepting or rejecting the message based on said sync and check status.

8. A method according to claim 7, wherein the step of accepting or rejecting further comprises the step of accepting a message if a successful check is determined within the check window.

9. A method according to claim 7, wherein the step of accepting or rejecting further comprises the step of accepting a message if a sync match and a successful check are determined simultaneously for a sample timing within the search windows.

10. A method according to claim 7, further comprising the step of updating a sync histogram based on acceptance of a message.

11. A method according to claim 10, further comprising the step of increasing a value of a histogram bin for sample times where a sync match was found and the CRC checked simultaneously, wherein said sync histogram has as many elements as sample timing positions and a bin is associated with each element.

12. A method according to claims 11, further comprising the steps of:

finding the largest bin and recording its index;

determining if the bin exceeds a predetermined upper limit;

subtracting the amount exceeding the upper limit from all of the bins; and adjusting the center of the sync search window, wherein the sample timing position associated with largest bin location is the center of the search window.

13. The method of claim 12, wherein the step of adjusting further comprises shifting the histogram to preserve correspondence between the sample timing positions and the bins.

14. A method according to claim 10, further comprising the step of decreasing a value of a bin for sampling times where a sync match and CRC check did not occur simultaneously, wherein said sync histogram has as many elements as sample timing positions and a bin is associated with each element.

15. A method according to claims 14, further comprising the steps of:

finding the largest bin and recording its index;

determining if the bin exceeds a predetermined upper limit;

subtracting the amount exceeding the upper limit from all of the bins; and adjusting the center of the sync search window, wherein the sample timing position associated with largest bin location is the center of the search window.

16. The method of claim 14, wherein the step of adjusting further comprises shifting the histogram to preserve correspondence between the sample timing positions and the bins.

17. A method according to claim 10, wherein said sync histogram is only updated when a message is accepted.

18. A method according to claim 7, further comprising the steps of:

comparing the message with a mobile station identification number, if the message is accepted, to determine if the message is for the mobile station; and determining whether to power down the mobile station after acceptance of the message.

19. In a radio communications system having at least one base station serving one or more mobile stations, a receiver circuit for increasing the probability of receiving an intended message in a mobile station comprising:

a receiver for sequentially receiving and demodulating finite length data messages from said at least one base station, each message comprising blocks of information bits and sample timing positions, each block including a number of data bits and a number of check bits whose values depend on the data bits;

a sync detector for processing said bit values to detect a predetermined data bit pattern signifying the beginning of a finite length data message and writing the status of each trial sample phase to a sync status register;

a cyclical redundancy check circuit (CRC) for writing a CRC check to a CRC check status register; and a message processor for determining a sync search window of sample timing positions centered about the expected position of a sync word and sync status indicating if a sync match is found for a current sample, wherein said message processor determines if the current sample falls within said search sync window, tests the check bits and determines the CRC check status for the location corresponding to the current sample timing position, and determines whether or not the current sample is within a check window of sample timing positions corresponding to the sample timing positions determined for said sync search window, said message processor accepting or rejecting the message based on said sync and CRC check status.

20. The system of claim 19, further comprising a sync mask register for indicating which sampling times both a sync match and successful CRC check were obtained.

21. The system of claim 19, further comprising:

a sync histogram register for storing the relative frequency with which each sample timing has been selected as the final sample timing position; and a sync histogram update circuit for maintaining the sync histogram when the center of the search window must be repositioned.

22. The system of claim 21, wherein the message processor determines the expected position of a sync word based on the values stored in said sync histogram register.

23. The system of claim 21, wherein the sync histogram update circuit only updates the sync histogram when a message is accepted by the message processor.

24. The system of claim 19, wherein said message processor accepts a message if a successful CRC check is determined within the check window.

25. The system of claim 19, wherein said message processor accepts a message if a sync match and successful CRC check are determined simultaneously for a sample timing within the search windows.

26. An improved message communications system comprising:

transmitter means for transmitting a message signal comprising a pattern including known bits followed by a block of information bits repeated a first number of times, each repeated block containing information bits and check bits that are a function of the information bits;

a receiver means for receiving said message signal and sampling to produce a second number of samples during each transmitted bit period;

sync detector means for processing said sample stream to search for said known bit pattern in said sample stream spaced apart by said second number of samples, starting at a given sample position, and recording in a sync storage means a detect or no-detect decision for each given sample position searched;

check detector means for processing samples in said sample stream spaced apart by said second number of samples, starting at a given sample to determine if said check processed samples contain information bits consistent with check bits, and recording a check or no-check indication in a check storage means for each given sample position;

message locating means for determining a starting position of a message in said sample stream based on the contents of said sync and check storage means registers.

27. A system according to claim 26, wherein said sync and check storage means comprise registers, and said message locating means includes means for forming a bitwise logical AND value between the contents of said sync and check registers.

28. A system according to claim 27 in which said message locating means further includes a histogram memory means for storing values related to historical frequencies for which each individual bit of said logical AND value have been equal to a logical 1.

29. A system according to claim 28, further comprising means to determine a histogram memory address containing the largest value.

30. A system according to claim 29, wherein said message locating means determines said message start position based on said largest value histogram memory address.

* * * * *